United States Patent
Kosche et al.

(10) Patent No.: US 6,421,826 B1
(45) Date of Patent: Jul. 16, 2002

(54) METHOD AND APPARATUS FOR PERFORMING PREFETCHING AT THE FUNCTION LEVEL

(75) Inventors: Nicolai Kosche, San Francisco; Peter C. Damron, Fremont, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/434,715

(22) Filed: Nov. 5, 1999

(51) Int. Cl.$^7$ .................................................. G06F 9/44
(52) U.S. Cl. ..................... 717/161; 717/160; 717/158
(58) Field of Search ............................. 717/9, 160, 161, 717/154, 158; 712/207; 711/118, 126, 135, 136

(56) References Cited

U.S. PATENT DOCUMENTS

| | | | |
|---|---|---|---|
| 5,214,766 A | * 5/1993 | Liu ............................. | 711/124 |
| 5,768,500 A | * 6/1998 | Agrawal et al. ............. | 717/130 |
| 5,854,934 A | 12/1998 | Hsu et al. .................... | 717/161 |
| 5,862,385 A | 1/1999 | Iitsuka ......................... | 717/160 |
| 5,930,507 A | 7/1999 | Nakahira et al. ............ | 717/160 |
| 5,964,867 A | * 10/1999 | Anderson et al. ........... | 712/219 |
| 6,092,180 A | * 7/2000 | Anderson et al. ............... | 717/9 |
| 6,119,075 A | * 9/2000 | Dean et al. .................. | 702/186 |
| 6,134,710 A | * 10/2000 | Levine et al. .................... | 717/9 |
| 6,189,072 B1 | * 2/2001 | Levine et al. ............... | 711/118 |
| 6,237,073 B1 | * 5/2001 | Dean et al. .................. | 711/202 |

FOREIGN PATENT DOCUMENTS

| EP | 0 743 598 A2 | 11/1996 |
|---|---|---|
| EP | 0 883 059 A2 | 12/1998 |

OTHER PUBLICATIONS

Abraham et al., Predictability of Load/Store Instruction Latencies, 1993, IEEE, p. 139–152.*

Sanchez et al., Cache Sensitive Modulo Scheduling, 1997, IEEE, p. 338–348.*

(List continued on next page.)

*Primary Examiner*—Tuan Q. Dam
*Assistant Examiner*—John Q. Chavis
(74) *Attorney, Agent, or Firm*—Park, Vaughan & Fleming LLP

(57) ABSTRACT

One embodiment of the present invention provides a system for compiling source code into executable code that performs prefetching for memory operations within regions of code that tend to generate cache misses. The system operates by compiling a source code module containing programming language instructions into an executable code module containing instructions suitable for execution by a processor. Next, the system runs the executable code module in a training mode on a representative workload and keeps statistics on cache miss rates for functions within the executable code module. These statistics are used to identify a set of "hot" functions that generate a large number of cache misses. Next, explicit prefetch instructions are scheduled in advance of memory operations within the set of hot functions. In one embodiment, explicit prefetch operations are scheduled into the executable code module by activating prefetch generation at a start of an identified function, and by deactivating prefetch generation at a return from the identified function. In embodiment, the system further schedules prefetch operations for the memory operations by identifying a subset of memory operations of a particular type within the set of hot functions, and scheduling explicit prefetch operations for memory operations belonging to the subset.

31 Claims, 4 Drawing Sheets

OTHER PUBLICATIONS

Srinivasan et al., Load Latency Tolerance in Dynamically Scheduled Processors, 1998, IEEE, p. 148–159.*

Mowry et al., Design and Evaluation of a Compiler Algorithm for Prefetching, 1992, ACM, p. 62–73.*

Chen et al., A Performance Study of Software and Hardware Data Prefetching Schemes, IEEE, p. 223–232.*

Publication entitled "Compiler's New Role in Data Cache Prefetching", by Chi–Hung Chi, XP 000478803, 13$^{th}$ World Computer Congress 94, vol. 1, pp. 189–194.

Publication entitled "Compiler–Based Prefetching for Recursive Data Structures", by Chi–Keung Luk and Todd C. Mowry, XP 000639234, University of Toronto, 1996 ACM 0–89791–767–7/96/0010, pp. 222–233.

* cited by examiner

```
# define    mutex_lock(lock)         \
            ( __turnon_prefetch()    \
            mutex_lock(lock) )

# define    mutex_unlock(lock)       \
            ( mutex_unlock(lock)     \
            __turnoff_prefetch() )
```

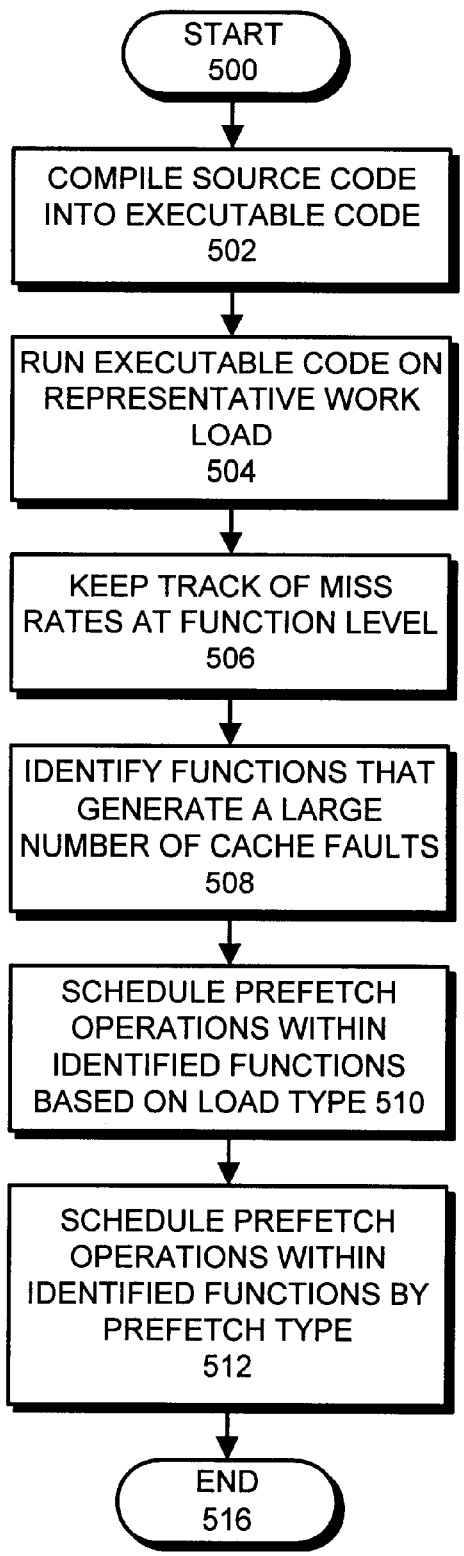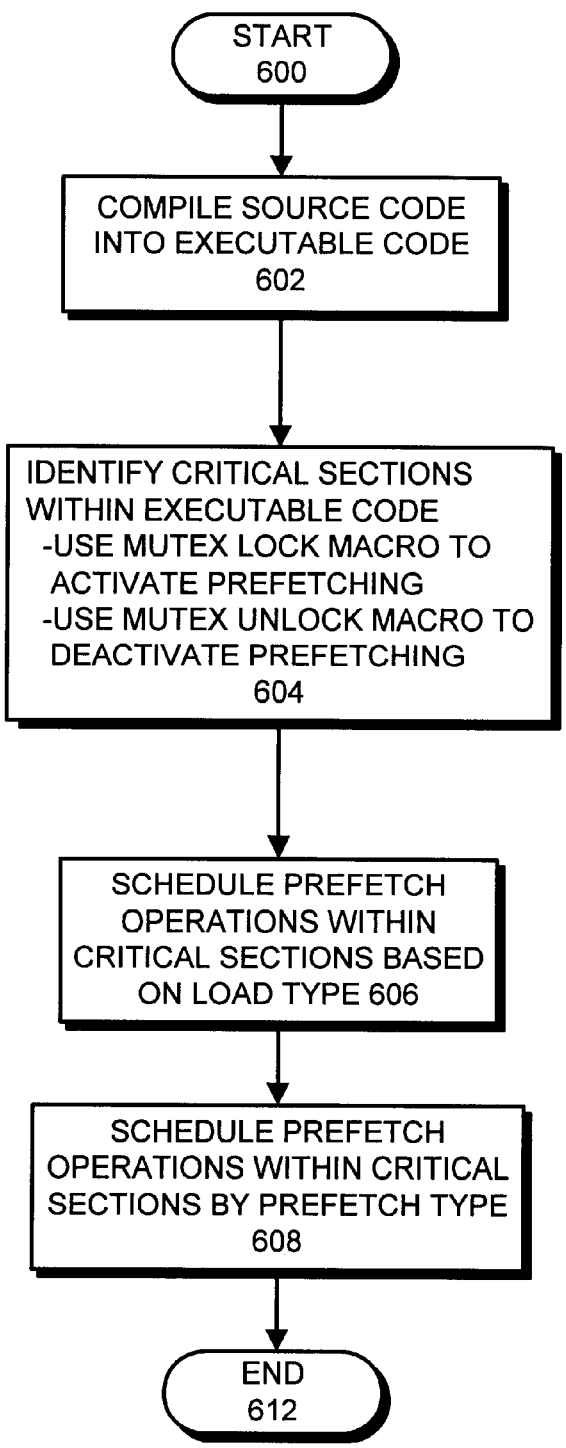
FIG. 5
FIG. 6

METHOD AND APPARATUS FOR PERFORMING PREFETCHING AT THE FUNCTION LEVEL

RELATED APPLICATION

The subject matter of this application is related to the subject matter in a co-pending non-provisional application by the same inventors as the instant application and filed on the same day as the instant application entitled, "Method and Apparatus for Performing Prefetching at the Critical Section Level," having Ser. No. 09/434,714, and filing date Nov. 5, 1999.

BACKGROUND

1. Field of the Invention

The present invention relates to compilers for computer systems. More specifically, the present invention provides a method and an apparatus for compiling source code into executable code that performs prefetching for memory operations within regions of code that tend to generate a large number of cache misses.

2. Related Art

As processor clock speeds continue to increase at an exponential rate, memory latencies are becoming a major bottleneck to computer system performance. On some applications a processor can spend as much as half of its time waiting for outstanding memory operations to move data from cache or main memory into registers within the processor. A single memory operation can cause the processor to wait for many clock cycles if the memory operation causes a cache miss from fast L1 cache and a corresponding access from slower L2 cache, or worse yet, causes a cache miss from L2 cache and a corresponding access from main memory.

It is possible to alleviate some of the performance limiting effects of memory operations by designing a system so that it can initiate a memory operation in advance of instructions that make use of the data returned from the memory operation. However, designing such capabilities into a processor can greatly increase the complexity of the processor. This increased complexity can increase the cost of the processor and can potentially decrease the clock speed of the processor if the additional complexity lengthens a critical path through the processor. Furthermore, the potential performance gains through the use of such techniques can be limited.

It is also possible to modify executable code during the compilation process so that it explicitly prefetches data associated with a memory operation in advance of where the memory operation takes place. This makes it likely that the data will be present in L1 cache when the memory operation occurs. This type of prefetching can be accomplished by scheduling an explicit prefetch operation into the code in advance of an associated memory operation in order to prefetch the data into L1 cache before the memory operation is encountered in the code.

Unfortunately, it is very hard to determine which data items should be prefetched and which ones should not. Prefetching all data items is wasteful because the memory system can become bottlenecked prefetching data items that are not referenced. On the other hand, analyzing individual memory operations to determine if they are good candidates for prefetching can consume a great deal of computational time.

What is needed is a method and an apparatus that selects a set of memory operations for prefetching without spending a great deal of time analyzing individual memory operations.

SUMMARY

One embodiment of the present invention provides a system for compiling source code into executable code that performs prefetching for memory operations within regions of code that tend to generate cache misses. The system operates by compiling a source code module containing programming language instructions into an executable code module containing instructions suitable for execution by a processor. Next, the system runs the executable code module in a training mode on a representative workload and keeps statistics on cache miss rates for functions within the executable code module. These statistics are used to identify a set of "hot" functions that generate a large number of cache misses. Next, explicit prefetch instructions are scheduled in advance of memory operations within the set of hot functions.

In one embodiment, explicit prefetch operations are scheduled into the executable code module by activating prefetch generation at a start of an identified function, and by deactivating prefetch generation at a return from the identified function.

In embodiment, the system further schedules prefetch operations for the memory operations by identifying a subset of memory operations of a particular type within the set of hot functions, and scheduling explicit prefetch operations for memory operations belonging to the subset. The particular type of memory operation can include, memory operations through pointers, memory operations involving static data, memory operations from locations that have not been previously accessed, memory operations outside of the system stack, and memory operations that are likely to be executed.

In one embodiment, the system schedules the prefetch operations by identifying a subset of prefetch operations with a particular property, and by scheduling the prefetch operations based on the property. For example, the particular property can include having an available issue slot, being located on an opposite side of a function call site from an associated memory operation, being located on the same side of a function call site from the associated memory operation, and being associated with a cache block that is not already subject to a scheduled prefetch operation.

One embodiment of the present invention provides a system for compiling source code into executable code that performs prefetching for memory operations within critical sections of code that are subject to mutual exclusion. The system operates by compiling a source code module containing programming language instructions into an executable code module containing instructions suitable for execution by a processor. Next, the system identifies a critical section within the executable code module by identifying a region of code between a mutual exclusion lock operation and a mutual exclusion unlock operation. The system schedules explicit prefetch instructions into the critical section in advance of associated memory operations.

In one embodiment, the system identifies the critical section of code by using a first macro to perform the mutual exclusion lock operation, wherein the first macro additionally activates prefetching. The system also uses a second macro to perform the mutual exclusion unlock operation, wherein the second macro additionally deactivates prefetching. Note that the second macro does not deactivate prefetching if the mutual exclusion unlock operation is nested within another critical section.

BRIEF DESCRIPTION OF THE FIGURES

FIG. 5 is a flow chart illustrating the process of creating code that prefetches loads within hot functions in accordance with an embodiment of the present invention.

FIG. 6 is a flow chart illustrating the process of creating code that prefetches loads within critical sections in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
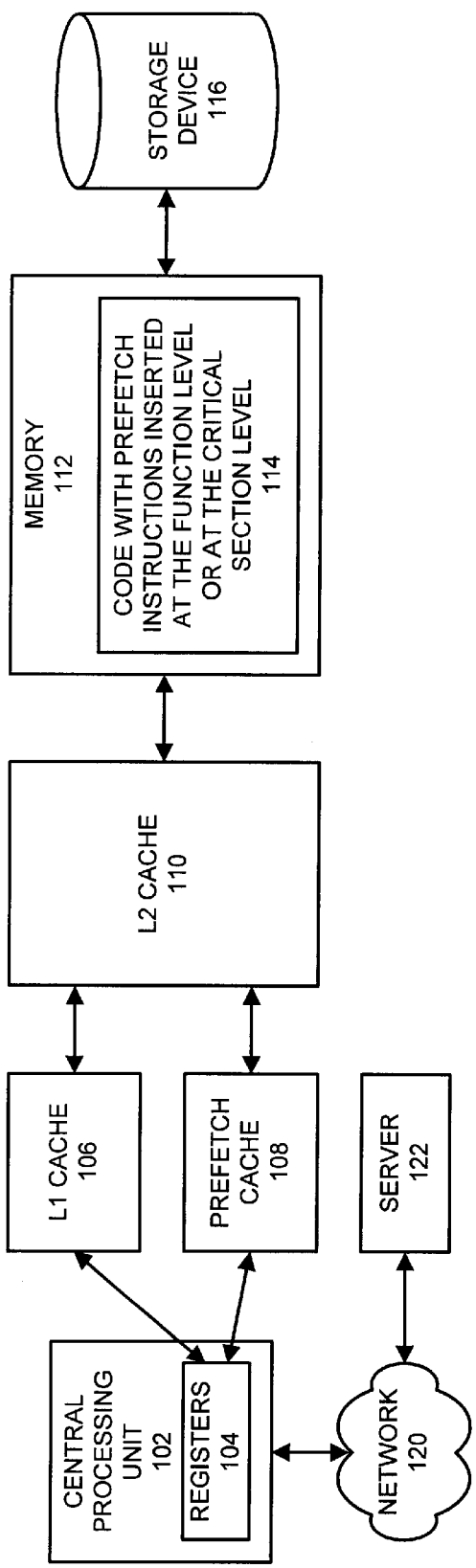
FIG. 1 illustrates a computer system in accordance with an embodiment of the present invention.

FIG. 1 illustrates the internal structure of computer system 100 in accordance with an embodiment of the present invention. In particular, FIG. 1 illustrates the memory hierarchy for computer system 100, which includes registers 104 within central processing unit (CPU) 102, L1 cache 106, prefetch cache 108, L2 cache 110, memory 112 and storage device 116.

CPU 102 can include any type of processing engine that can be used in a computer system, including, but not limited to, a microprocessor, a mainframe processor, a device controller, a processor within a personal organizer and processing circuitry within an appliance. Registers 104 are internal registers within CPU 102 into which data is loaded from L1 cache 106, prefetch cache 108, L2 cache 110 or memory 112. Once data is loaded into registers 104, CPU 102 can perform computational operations on the data. (Although this disclosure often discusses prefetching for "load" operations, please note that the discussion applies to any memory operations that can benefit from prefetching, including stores and other memory references.)

Data is loaded into registers 104 from L1 cache 106. L1 cache 106 is a high-speed cache memory of limited size that is located in close proximity to CPU 102. In some embodiments, L1 cache 106 may be located within the same semiconductor chip as CPU 102.

Similarly, data is loaded into registers 104 from prefetch cache 108. Prefetch cache 108 is also a high-speed cache memory of limited size that is located in close proximity to CPU 102. The difference between prefetch cache 108 and L1 cache 106 is that prefetch cache 108 holds data that is explicitly prefetched, whereas L1 cache 106 holds data that has been recently referenced, but not prefetched. The use of prefetch cache 108 allows speculative prefetching to take place without polluting L1 cache 106.

Data is loaded into L1 cache 106 and prefetch cache 108 from L2 cache 110. L2 cache 110 is considerably larger that L1 cache 106 or prefetch cache 108. However, L2 cache is located farther from CPU 102, and hence accesses to L2 cache 110 take more time than accesses to L1 cache 106 or prefetch cache 108. However, note that accesses to L2 cache take less time than accesses to memory 112.

L1 cache 106, prefetch cache 108 and L2 cache 110 may be designed in a number of ways. For example, they may include direct-mapped caches, fully associative caches or set-associative caches. They may also include write-through or write-back caches.

Data is loaded into L2 cache from memory 112. Memory 112 can include any type of random access memory that can be used to store code and/or data for use by CPU 102. In the embodiment of the present invention illustrated in FIG. 1, memory 112 contains code with explicit prefetch instructions that are inserted at the function level or at the critical section level as is discussed below with reference to FIGS. 2–6.

Data is loaded into memory 112 from files within storage device 116. Storage device 116 can include any type of non-volatile storage device for storing code and/or data to be operated on by CPU 102. In one embodiment, storage device 116 includes a magnetic disk drive.

FIG. 1 also illustrates how CPU 102 can be coupled to server 122 through network 120. Network 120 can include any type of wire or wireless communication channel capable of coupling together computing nodes. This includes, but is not limited to, a local area network, a wide area network, or a combination of networks. In one embodiment of the present invention, network 120 includes the Internet. Server 122 can include any computational node including a mechanism for servicing requests from a client for computational or data storage resources. In embodiment of the present invention, server 122 is a file server that contains executable code to by executed by CPU 102. Also note that although network 120 is illustrated as being directly coupled to CPU 102, in general network 102 can be coupled to other locations within the computer system illustrated in FIG. 1.

Note that FIG. 1 does not illustrate the many possible ways in which components of the memory hierarchy can be coupled together through various data paths and busses. Also note that the present invention can generally be applied to any type of computer system with prefetch capability, not just the specific computer system illustrated in FIG. 1.

Loads within Regions of Code

Figure 2:
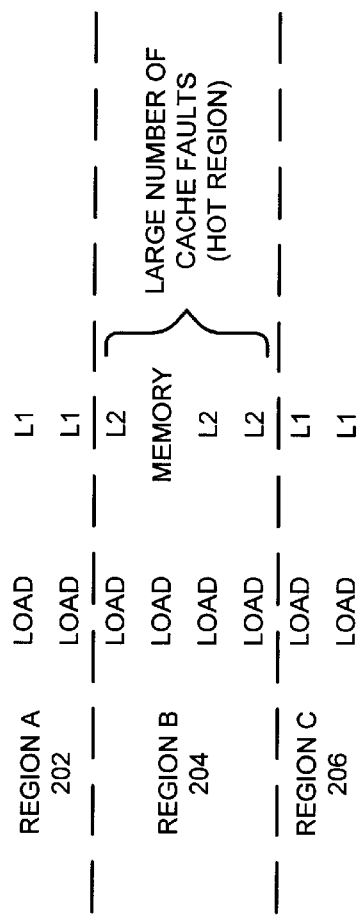
FIG. 2 illustrates load operations occurring within regions of executable code in accordance with an embodiment of the present invention.

FIG. 2 illustrates load operations occurring within regions of executable code in accordance with an embodiment of the present invention. FIG. 2 illustrates a section of code that is divided into regions, including region A 202, region B 204 and region C 206. These regions include load operations to load data from the memory hierarchy into registers 104 within CPU 102. These load operations are illustrated in the middle column of FIG. 1. Note that the section of code also includes many intervening non-load operations, which are not illustrated. These non-load operations manipulate the data that is pulled into registers 104 by the load operations.

The right-hand column of FIG. 2 illustrates the results of the load operations. More specifically, the first two load operations from the top of FIG. 2 (which are within region A 202) are retrieved from L1 cache 106. The next four load operations (within region B 204) are retrieved from L2 cache 110, memory 112, L2 cache 110 and L2 cache 110, respectively. The last two loads (within region C 206) are retrieved from L1 cache 106.

In this example, all of the loads within region B 204 generate cache misses from L1 cache 106 to L2 cache 110. One of these loads generates an additional cache miss in L2 cache 110 and a corresponding access to memory 112. Region B 204 is referred to as a "hot" region because a high percentage of the loads within region B 204 generate cache misses. Hence, the loads within region B 204 are good candidates for prefetching.

Note that region boundaries can be determined in a number of ways. In one embodiment of the present invention, region boundaries are function boundaries. In another embodiment, region boundaries are critical section boundaries. Note that loads within critical sections tend to generate a large number of cache misses because critical sections typically access shared data, which is prone to cache misses. Region boundaries may also encompass arbitrary "hot" regions of code that are specified by a user. Regions boundaries can also encompass complete source files, which can be specified in a command line.

Prefetching for Critical Sections

Figures 3A, 3B:
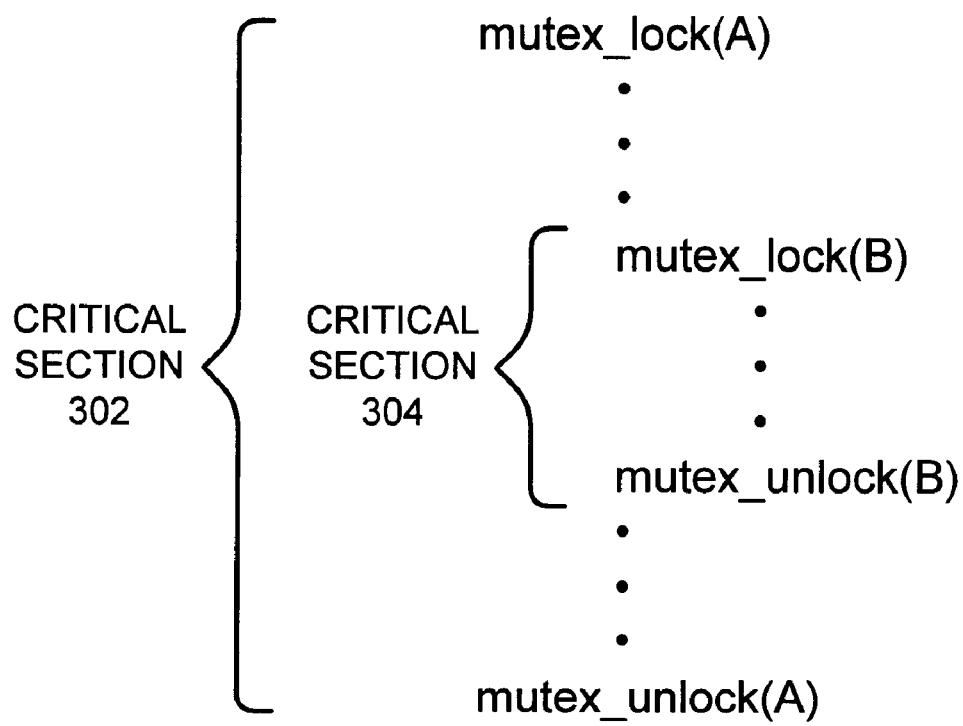
FIG. 3A illustrates macros that enable and disable prefetching in accordance with an embodiment of the present invention.
FIG. 3B illustrates nesting of critical sections in accordance with an embodiment of the present invention.

FIG. 3A illustrates mutual exclusion macros that enable and disable prefetching in accordance with an embodiment of the present invention. The first macro at the top of FIG. 3A is a mutual exclusion lock macro that turns on a prefetching feature of the compiler with specific prefetch properties before locking a mutual exclusion variable. This prefetching feature attempts to perform prefetching for all load operations unless the prefetch operations are filtered out as is discussed below with reference to FIGS. 5 and 6. Note that the mutual exclusion variable can generally include any type of mutual exclusion variable, such as a mutual exclusion variable associated with a spin lock, a semaphore, a read-writer lock, a turnstile, a mutex lock, an adaptive mutex lock, or any other mutual exclusion mechanism.

Also note that the prefetching feature can have specific prefetch properties for associated load and prefetch instructions. These properties are discussed in more detail below. Hence, different mutual exclusion macros can activate different prefetching properties. In other embodiment of the present invention different prefetching properties can be activated at the function level, the file level or within an arbitrary region of code. These different prefetching properties can be activated and deactivated by different regions markers (such as mutual exclusion macros) that are specific to particular properties. Note that these different region markers can be nested.

The second macro in FIG. 3A illustrates a corresponding mutual exclusion unlock macro that unlocks the mutual exclusion variable and turns off the prefetching feature. In one embodiment of the present invention, the system checks for an unmatched second macro that deactivates prefetching and is not preceded by a matching first macro that activates prefetching. If such an unmatched second macro is encountered, the may system signal an error condition.

FIG. 3B illustrates nesting of critical sections in accordance with an embodiment of the present invention. In many applications, critical sections are nested. For example, in FIG. 3B, critical section B 304, which is bounded by a mutex_lock(B) and mutex_unlock(B), is nested within critical section A 302, which is bounded by a mutex_lock(A) and mutex_unlock(A). In this case, the turnoff prefetch( ) function keeps track of the number of nested critical sections and does not turn off prefetching at the end of a nested critical section. For example, the mutex_unlock (B) call within FIG. 3B does not turn off prefetching because it is associated with nested critical section B 304. However, the mutex_unlock(A) call does turn off prefetching because subsequent code is outside of any critical section and is not subject to prefetching.

FIG. 6 is a flow chart illustrating the process of creating code that prefetches loads within critical sections in accordance with an embodiment of the present invention. The system starts by compiling a source code module into executable code instructions to produce a corresponding executable code module (step 602). In doing so, the system identifies critical sections (step 604). This can be done by using the mutex_lock( ) and mutex_unlock( ) macros illustrated in FIG. 3A. Alternatively, the compiler can be modified to look for mutual exclusion lock and unlock operations in order to enable and disable prefetching.

Next, the system examines the load operations within the critical sections and schedules prefetch operations for certain types of load operations (step 606). This can greatly reduce the number of prefetch operations. For example, the system can choose to prefetch, loads through pointers, loads of static data, loads through pointer and loads of static data, loads from outside the system stack, or loads that are likely to be executed. Note that loads that are likely to be executed can be identified by running the executable code in a training mode. Also note that loads within the system stack or loads from locations that have been previously loaded are unlikely to generate cache misses and are hence bad candidates for prefetching.

The system can also schedule prefetch operations that appear within critical sections based upon properties of the prefetch operations (step 608). For example, the system can choose to schedule a prefetch operations only if there exists an available load issue slot and available outstanding loads for the prefetch operation. Note that a typical load store unit in a processor has a small number of load issue slots available as well as a limited number of outstanding loads. If these load issue slots are filled, it makes little sense to schedule a prefetch because no load issue slots are available for the prefetch. The system can also schedule a prefetch operation on an opposite side of a function call site from an associated load operation (or alternatively on the same side of the function call site). This can be useful if the call site is for a function that is unlikely to affect the cache, such as a mutex lock function. For other types of functions it makes little sense to issue a prefetch before the function call, because the function call is likely to move the flow of execution to another region of the code for a long period of time. The system can also schedule a prefetch for a cache block that is not already subject to a scheduled prefetch operation.

At this point, the source code is ready for normal program execution.

Prefetching Loads that are likely to be Executed

Figure 4:
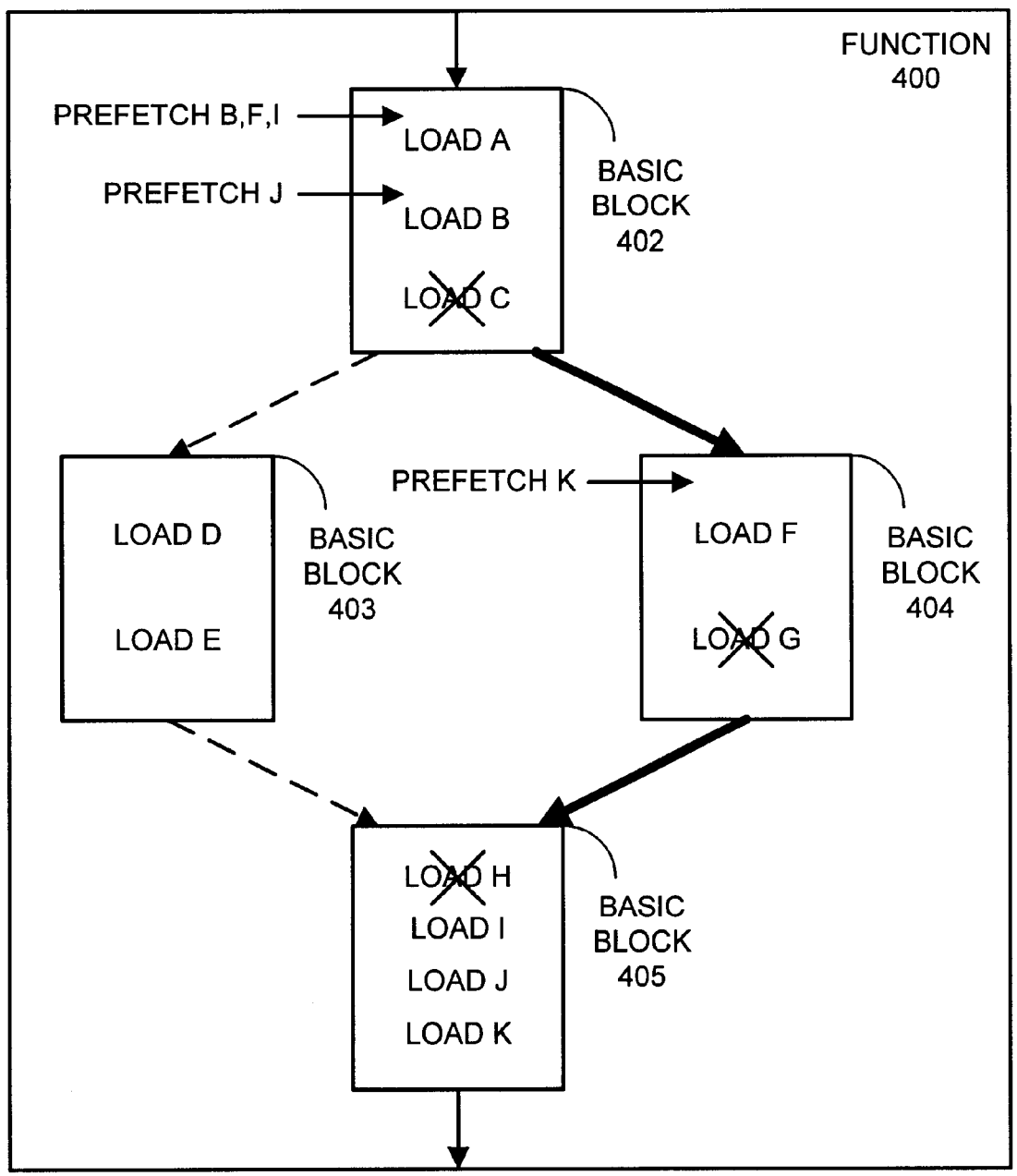
FIG. 4 presents an example of prefetching loads that are likely to be executed accordance with an embodiment of the present invention.

FIG. 4 presents an example of prefetching loads that are likely to be executed in accordance with an embodiment of the present invention. Function 400 is divided into four basic blocks 402–405. A basic block is a section of code that executes without a change in control flow. Hence, a basic block contains at most one branch or function call at the end of the block. In FIG. 4, there is a conditional branch at the end of basic block 402, which goes to either basic block 404 or basic block 403. Later on, these separate branch paths rejoin in basic block 405.

Each of the illustrated basic blocks 402–405 includes load operations. More specifically, basic block 402 includes loads A and B. Basic block 403 includes loads D and E. Basic block 404 includes loads F and G. Finally, basic block 405 includes loads H, I, J and K.

In the example illustrated in FIG. 4, assume that function 400 is a "hot" function that has exhibited a large number of cache misses while running on a representative workload. In this example, the system starts by filtering out loads that are directed to the system stack, because these loads are unlikely to generate cache misses. This eliminates loads C, G and H.

Next, the system eliminates loads that are not likely to be executed. Assume that basic blocks 402, 404 and 405 contain likely executed load operations. This eliminates loads D and E. Note that the system can identify the load instructions that are likely to be executed by running a program containing function 400 in a "training mode" on a representative workload and by keeping statistics on which instructions are executed through function 400.

Next, the system schedules prefetches up the likely execution path. In doing so, the system ensures that the number of outstanding prefetches does not exceed the number of available load issue slots in the system's load store unit and the maximum number of outstanding loads. The example illustrated in FIG. 4 assumes there are four outstanding loads available. Hence, at the beginning of basic block 402, the system prefetches loads B, F and I prior to load A. (Note that the three prefetches for B, F and I plus the load of A will take up the four load issue slots). Next, assuming that the prefetch of B completes immediately after the load of A completes, another outstanding load becomes available and the system prefetches load J. Later on, assuming the prefetch of F completes before load F is encountered, the system prefetches load K.

Note that the technique of prefetching loads that are likely to be executed can be performed for any region of code, and is not limited to a function. For example, the system can also prefetch loads that are likely to be executed within a critical section, or any other arbitrary section of code.

Prefetching for Selected Functions

FIG. 5 is a flow chart illustrating the process of creating code that prefetches loads within hot functions in accordance with an embodiment of the present invention. The system starts by compiling a source code module into executable code instructions to produce a corresponding executable code module (step 502).

Next, the system determines which functions within the executable module tend to create a large number of cache misses. We refer to these functions as "hot functions." The system does so by running the executable module in a training mode on a representative workload (step 504), and by keeping statistics on cache miss rates at the function level (step 506). Next, the system uses these statistics to identify functions that tend to generate a large number of cache misses (step 508).

Next, the system examines all load operations within the hot functions and schedules prefetch operations for certain types of load operations (as was done above for critical sections) (step 510). The system can also schedule prefetch operations that appear within hot functions based upon properties of the prefetch operations (step 512). At this point, the source code is ready for normal program execution.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for compiling source code into executable code that performs prefetching for memory operations within regions of code that tend to generate cache misses, comprising:
    compiling a source code module containing programming language instructions into an executable code module containing instructions suitable for execution by a processor;
    identifying functions containing memory operations that tend to generate a large number of cache misses by,
        running the executable code module on the processor in a training mode on a representative workload,
        keeping statistics on cache miss rates for memory operations within functions within the executable code module, and
    identifying a set of functions that generate a large number of cache misses; and
    scheduling explicit prefetch instructions into the executable code module in advance of memory operations within the identified set of functions and not in other functions, so that prefetch operations are performed for memory operations within only functions that generate the large number of cache misses.

2. The method of claim 1, wherein scheduling explicit prefetch operations into the executable code module includes,
    activating prefetch generation at a start of an identified function; and
    deactivating prefetch generation at a return from the identified function.

3. The method of claim 2, wherein activating prefetch generation includes activating prefetch generation in response to prefetch generation being specified in a command line.

4. The method of claim 1, further comprising:
    identifying a critical section within the executable code module by identifying a region of code between a mutual exclusion lock operation and a mutual exclusion unlock operation; and
    scheduling explicit prefetch instructions into the executable code module in advance of memory operations located within the critical section, so that prefetch operations are performed for memory operations within the critical section.

5. The method of claim 1, wherein scheduling explicit prefetch instructions into the executable code module further comprises:
    identifying a subset of memory operations of a particular type within the identified set of functions; and
    scheduling explicit prefetch operations for memory operations belonging to the subset.

6. The method of claim 5, wherein the particular type of memory operation includes one of,
    memory operations through pointers;
    memory operations involving static data;
    memory operations from locations that have not been previously accessed;

memory operations outside a system stack; and memory operations that are likely to be executed.

7. The method of claim 1, wherein scheduling explicit prefetch instructions into the executable code module further comprises:

identifying a subset of prefetch operations with a particular property that are associated with memory operations within the identified set of functions; and scheduling explicit prefetch operations for prefetch operations belonging to the subset based on properties of the subset.

8. The method of claim 7, wherein the particular property of the subset of prefetch operations includes, but is not limited to, one of, existence of an available issue slot for the prefetch operation;

being located on the same side of a function call site from an associated memory operation;

being located on an opposite side of a function call site from an associated memory operation; and being associated with a cache block that is not already subject to a scheduled prefetch operation.

9. A computer readable storage medium storing instructions that when executed by a computer cause the computer to perform a method for compiling source code into executable code that performs prefetching for memory operations within regions of code that tend to generate cache misses, comprising:

compiling a source code module containing programming language instructions into an executable code module containing instructions suitable for execution by a processor;

identifying functions containing memory operations that tend to generate a large number of cache misses by,
running the executable code module on the processor in a training mode on a representative workload,
keeping statistics on cache miss rates for memory operations within functions within the executable code module, and
identifying a set of functions that generate the large number of cache misses; and scheduling explicit prefetch instructions into the executable code module in advance of memory operations within the identified set of functions and not in other functions, so that prefetch operations are performed for memory operations within only functions that generate the large number of cache misses.

10. The computer-readable storage medium of claim 9, wherein scheduling explicit prefetch operations into the executable code module includes, activating prefetch generation at a start of an identified function; and deactivating prefetch generation at a return from the identified function.

11. The computer-readable storage medium of claim 10, wherein activating prefetch generation includes activating prefetch generation in response to prefetch generation being specified in a command line.

12. The computer-readable storage medium of claim 9, wherein the method embodied within the instructions stored within the computer-readable storage medium further comprises:

identifying a critical section within the executable code module by identifying a region of code between a mutual exclusion lock operation and a mutual exclusion unlock operation; and scheduling explicit prefetch instructions into the executable code module in advance of memory operations located within the critical section, so that prefetch operations are performed for memory operations within the critical section.

13. The computer-readable storage medium of claim 9, wherein scheduling explicit prefetch instructions into the executable code module further comprises:

identifying a subset of memory operations of a particular type within the identified set of functions; and scheduling explicit prefetch operations for memory operations belonging to the subset.

14. The computer-readable storage medium of claim 13, wherein the particular type of memory operation includes, but is not limited to, one of, memory operations through pointers;

memory operations involving static data;

memory operations from locations that have not been previously accessed;

memory operations outside a system stack; and memory operations that are likely to be executed.

15. The computer-readable storage medium of claim 9, wherein scheduling explicit prefetch instructions into the executable code module further comprises:

identifying a subset of prefetch operations with a particular property that are associated with memory operations within the identified set of functions; and scheduling explicit prefetch operations for prefetch operations belonging to the subset based on properties of the subset.

16. The computer-readable storage medium of claim 15, wherein the particular property of the subset of prefetch operations includes, but is not limited to, one of, existence of an available issue slot for the prefetch operation;

being located on the same side of a function call site from an associated memory operation;

being located on an opposite side of a function call site from an associated memory operation; and being associated with a cache block that is not already subject to a scheduled prefetch operation.

17. An apparatus that compiles source code into executable code that performs prefetching for memory operations within regions of code that tend to generate cache misses, comprising:

a compiling mechanism that compiles a source code module containing programming language instructions into an executable code module containing instructions suitable for execution by a processor;

an identification mechanism that identifies functions containing memory operations that tend to generate a large number of cache misses, the identification mechanism being configured to,
run the executable code module on the processor in a training mode on a representative workload,
keep statistics on cache miss rates for memory operations within functions within the executable code module, and
identify a set of functions that generate the large number of cache misses; and a scheduling mechanism that schedules explicit prefetch instructions into the executable code module in advance of memory operations within the identified set of functions and not in other functions, so that prefetch operations are performed for memory operations within only functions that generate the large number of cache misses.

18. The apparatus of claim 17, wherein the scheduling mechanism is configured to,
activate prefetch generation at a start of an identified function; and
deactivate prefetch generation at a return from the identified function.

19. The apparatus of claim 18, wherein the scheduling mechanism is configured to activate prefetch generation in response to prefetch generation being specified in a command line.

20. The apparatus of claim 17, wherein:
the identification mechanism is further configured to identify a critical section within the executable code module by identifying a region of code between a mutual exclusion lock operation and a mutual exclusion unlock operation; and
the scheduling mechanism is further configured to schedule explicit prefetch instructions into the executable code module in advance of memory operations located within the critical section, so that prefetch operations are performed for memory operations within the critical section.

21. The apparatus of claim 17, wherein the scheduling mechanism is further configured to:
identify a subset of memory operations of a particular type within the identified set of functions; and to
schedule explicit prefetch operations for memory operations belonging to the subset.

22. The apparatus of claim 21, wherein the particular type of memory operation includes, but is not limited to, one of,
memory operations through pointers;
memory operations involving static data;
memory operations from locations that have not been previously accessed;
memory operations outside a system stack; and
memory operations that are likely to be executed.

23. The apparatus of claim 17, wherein the scheduling mechanism is further configured to:
identify a subset of prefetch operations of with a particular property that are associated with memory operations within the identified set of functions; and to
schedule explicit prefetch operations for prefetch operations belonging to the subset based on properties of the subset.

24. The apparatus of claim 23, wherein the particular property of the subset of prefetch operations includes, but is not limited to, one of,
existence of an available issue slot for the prefetch operation;
being located on the same side of a function call site from an associated memory operation;
being located on an opposite side of a function call site from an associated memory operation; and
being associated with a cache block that is not already subject to a scheduled prefetch operation.

25. A method for compiling source code into executable code that performs prefetching for memory operations within regions of code that tend to generate cache misses, comprising:
compiling a source code module containing programming language instructions into an executable code module containing instructions suitable for execution by a processor;
identifying a region of code containing memory operations that tend to generate a large number of cache misses; and
scheduling explicit prefetch instructions into the executable code module in advance of memory operations within the identified a region of code and not in other regions of code, so that prefetch operations are performed for memory operations within only the region of code that tends to generate the large number of cache misses.

26. The method of claim 25, wherein scheduling explicit prefetch instructions into the executable code module further comprises:
identifying a subset of memory operations of a particular type within the identified set of functions; and
scheduling explicit prefetch operations for memory operations belonging to the subset.

27. The method of claim 26, wherein the particular type of memory operation includes, but is not limited to, one of,
memory operations through pointers;
memory operations involving static data;
memory operations from locations that have not been previously accessed;
memory operations outside a system stack; and
memory operations that are likely to be executed.

28. The method of claim 26, wherein the particular type of memory operation is specified by a region marker for the region of code.

29. The method of claim 25, wherein scheduling explicit prefetch instructions into the executable code module further comprises:
identifying a subset of prefetch operations with a particular property that are associated with memory operations within the identified set of functions; and
scheduling explicit prefetch operations for prefetch operations belonging to the subset based on properties of the subset.

30. The method of claim 29, wherein the particular property of the subset of prefetch operations includes, but is not limited to, one of,
existence of an available issue slot for the prefetch operation;
being located on the same side of a function call site from an associated memory operation;
being located on an opposite side of a function call site from an associated memory operation; and
being associated with a cache block that is not already subject to a scheduled prefetch operation.

31. The method of claim 29, wherein the particular property of the subset of prefetch operations is specified by a region marker for the region of code.

* * * * *